United States Patent

Umetani et al.

[11] Patent Number: 5,297,937
[45] Date of Patent: Mar. 29, 1994

[54] HOLLOW FAN MOVING BLADE

[75] Inventors: Masahiko Umetani; Haruomi Makita, both of Komaki, Japan

[73] Assignee: Mitsubishi Jukogyo Kabushiki Kaisha, Tokyo, Japan

[21] Appl. No.: 933,075

[22] Filed: Aug. 21, 1992

[30] Foreign Application Priority Data

Aug. 23, 1991 [JP] Japan .................. 3-212125

[51] Int. Cl.⁵ .................................. F01D 5/18
[52] U.S. Cl. .................. 416/233; 416/96 A; 416/232
[58] Field of Search ............ 416/233, 232, 223 R; 29/889.72; 228/193, 195; 426/96 A, 226

[56] References Cited

U.S. PATENT DOCUMENTS

| | | | |
|---|---|---|---|
| 3,222,774 | 12/1965 | Kump et al. | 228/195 |
| 3,566,493 | 3/1971 | Poucher et al. | 416/232 |
| 3,806,276 | 4/1974 | Aspinwall | 416/96 A |
| 3,858,290 | 1/1975 | Albani | 416/96 A |
| 4,043,498 | 8/1977 | Conn | 29/889.72 |
| 4,208,222 | 6/1980 | Barlow et al. | 228/195 |
| 4,583,914 | 4/1986 | Craig et al. | |
| 4,604,780 | 8/1986 | Metcalfe | 228/193 |
| 4,768,700 | 9/1988 | Chen | 228/193 |

FOREIGN PATENT DOCUMENTS

| | | |
|---|---|---|
| 0032646 | 7/1981 | France . |
| 0210378 | 10/1985 | Japan ........ 228/193 |
| 344007 | 2/1931 | United Kingdom . |
| 0716612 | 10/1954 | United Kingdom ........ 416/232 |
| 1525027 | 9/1978 | United Kingdom . |
| 1537447 | 12/1978 | United Kingdom . |
| 1564608 | 4/1980 | United Kingdom . |
| 1589191 | 5/1981 | United Kingdom . |
| 2154286 | 9/1985 | United Kingdom . |
| 2210415 | 6/1989 | United Kingdom . |

Primary Examiner—Edward K. Look
Assistant Examiner—Mark Sgantzos
Attorney, Agent, or Firm—Wenderoth, Lind & Ponack

[57] ABSTRACT

A hollow rotor blade of a gas turbine includes a shaped core accommodated within a hollow space formed between two skins and joined to the skins. The fatigue strength at a portion where the skins are joined to the core is enhanced. More specifically, the portions of the skins joined with the core are in the form of island-shaped protrusions, and the core is joined to these protrusions by solid-phase diffusion bonding, diffusion-brazing, liquid-phase diffusion bonding, and the like.

10 Claims, 6 Drawing Sheets

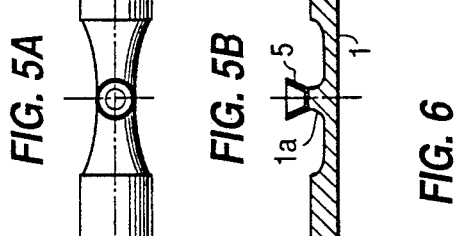
FIG. 5A
FIG. 5B
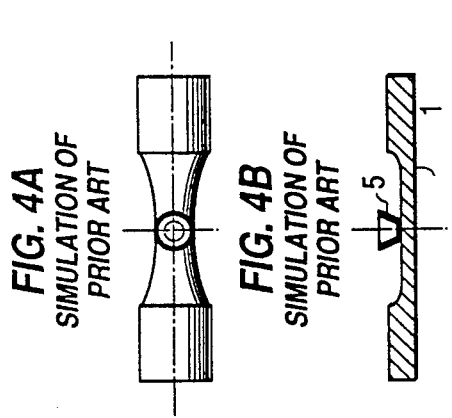
FIG. 4A
SIMULATION OF PRIOR ART
FIG. 4B
SIMULATION OF PRIOR ART
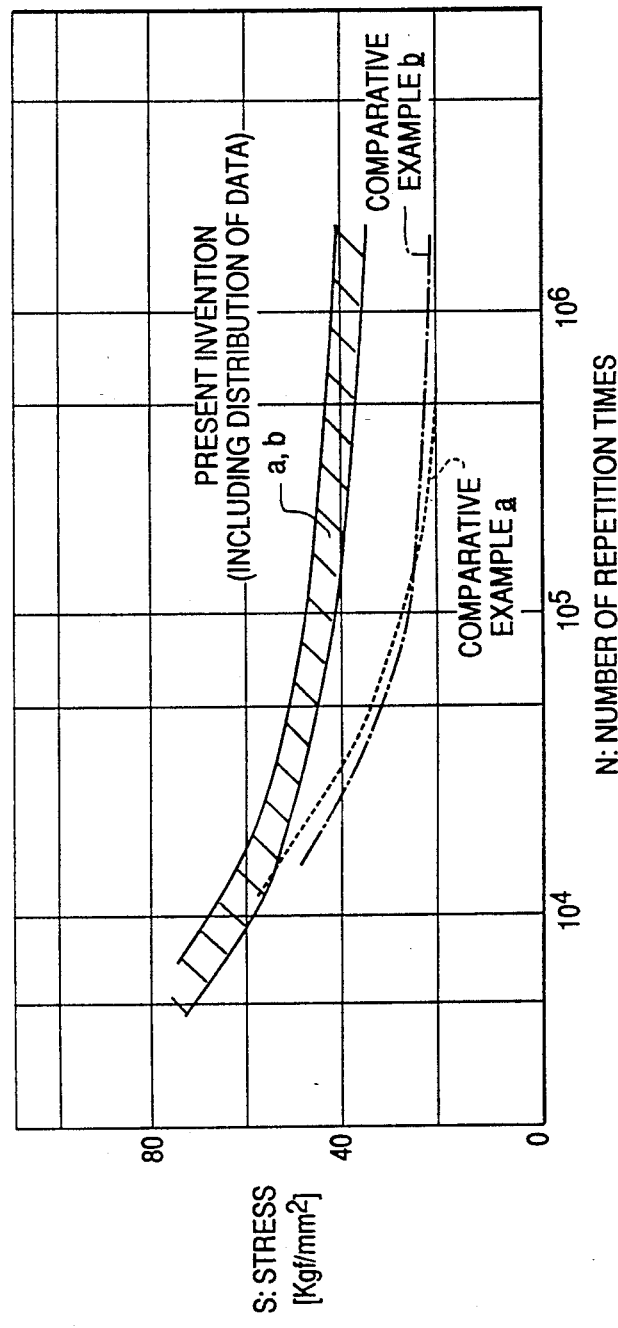
FIG. 6

FIG. 7
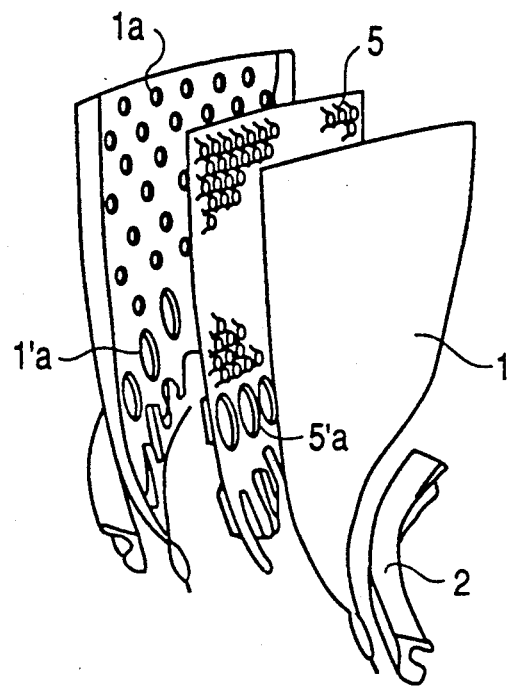
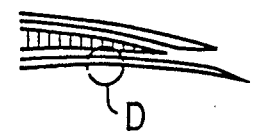
FIG. 8(b)
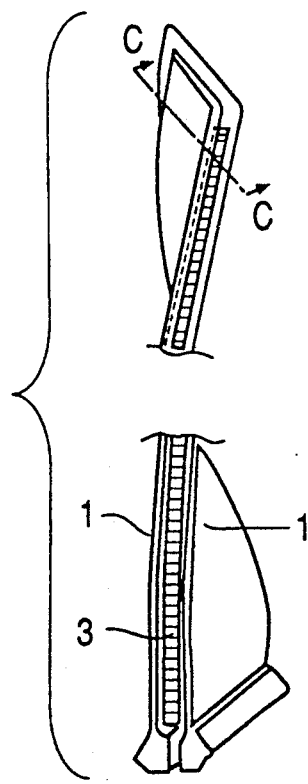
FIG. 8(a)

1

HOLLOW FAN MOVING BLADE

BACKGROUND OF THE INVENTION

1. Field of the Invention

The present invention relates to a hollow rotor blade of a gas turbine, and more particularly to a lightweight hollow rotor blade having high mechanical strength provided by enhanced fatigue strength of bonded portions between the skin and a core of the blade.

2. Description of the Related Art

A hollow rotor blade of a gas turbine in the related art includes a shaped core accommodated in a hollow space formed between two skins constituting blade surface outer plates. The core is bonded to the insides of the two skins. In examples of such hollow blades, a honeycomb core 3 is inserted in a hollow space between skins 1 as shown in FIG. 8, or a core 4 or 5 shaped by superplastic working is inserted in a hollow space between skins 1 as shown in FIG. 10 and in FIG. 11.

In the hollow rotor blade shown in FIG. 8, the honeycomb core 3 is inserted in a space formed between the two skins 1, and the same honeycomb core 3 and the skins 1 are bonded to each other.

In the hollow rotor blade shown in FIG. 10, a corrugated plate core 4 is inserted in a space formed between two skins 1 having radially inner ends held by dovetails 2, and the corrugated plate core 4 and the skins 1 are bonded to each other.

The hollow rotor blade shown in FIG. 11 was invented by the present inventors and disclosed in Laid-Open Japanese Patent Specification No. 2-125902 (1990). This hollow rotor blade comprises a dimpled core 5.

The bonded portions between the above-described skins and cores are respectively shown in FIG. 9 and in FIGS. 13 to 15. FIG. 9 is an enlarged view of a portion marked D in FIG. 8, and FIGS. 13 to 15 are enlarged views of a portion marked F in FIG. 12. FIG. 12 is a cross-sectional view taken along line E—E in FIG. 10 or in FIG. 11. FIG. 13 shows the case of bonding by brazing, FIG. 14 shows the case of liquid-phase diffusion bonding, and FIG. 15 shows the case of solid-phase diffusion bonding.

In the above-described hollow rotor blades of a gas turbine in the related art, due to the fact that cores shaped by such techniques as superplastic working are directly bonded to skins through brazing, liquid-phase diffusion bonding, solid-phase diffusion bonding or the like, stresses in the skins generated by aerodynamic loads of the moving blades directly act upon the bonded portions of the core. Therefore, cracks are liable to arise at the bonded portions, especially at the portions marked X in FIGS. 9, 13, 14 and 15 which are stress concentrating portions inherent to the bonding configuration of the skins and the core. This degrades the fatigue strength.

Therefore, in the above-described hollow rotor blades of a gas turbine in the related art, a stress level of the skin was lowered and the necessary fatigue strength was obtained by employing rather thick skins.

SUMMARY OF THE INVENTION

It is therefore one object of the present invention to provide an improved hollow rotor blade of a gas turbine in which the above-mentioned problems have been resolved.

According to the present invention, there is provided a hollow rotor blade of a gas turbine comprising a shaped core accommodated within a hollow space formed between two skins constituting blade surface outer plates, the core being joined to the two skins at island-shaped protrusions defined at inner surfaces of the skins.

There is also provided a method for making a hollow rotor blade of a gas turbine, consisting of the steps of disposing two skins, each having a plurality of island-shaped protrusions projecting at one surface thereof, opposite one another with the island-shaped protrusions of the respective skins located on opposite sides of a space defined between the skins, and joining a core to the island-shaped protrusions of the respective skins within the space defined between the two skins by solid-phase diffusion bonding, liquid-phase diffusion bonding or diffusion brazing.

In the above-described hollow rotor blade according to the present invention, the shaped core accommodated in a hollow space formed between two skins, constituting blade surface outer plates, is joined to the island-shaped protrusions formed on the skins. Accordingly, lines of stress within the skins do not propagate to the portions where the skins are joined to the core. That is, the stress does not concentrate at the ends of the portions where the core joins the skins.

Therefore, the fatigue strength of the blade is enhanced, and thus thin skins can be used.

Also, the method for making a hollow rotor blade of a gas turbine according to the present invention requires only simple manufacturing steps and yet the fatigue strength of the blade can be enhanced.

The above-mentioned and other objects, features and advantages of the present invention will become more apparent by referring to the following description of preferred embodiments of the invention taken in conjunction with the accompanying drawings.

BRIEF DESCRIPTION OF THE DRAWINGS

In the accompanying drawings:

FIG. 4 is an illustration of a test piece for comparison with the present invention;

FIG. 5 is an illustration of a test piece of the first preferred embodiment;

FIG. 6 is a diagram showing results of a fatigue test;

FIG. 7 is an exploded perspective view showing a second preferred embodiment of the present invention;

FIG. 8(a) is a schematic perspective view of a hollow rotor blade of the related art;

FIG. 8(b) is a cross-sectional view taken along line C—C in FIG. 8(a);

DETAILED DESCRIPTION OF THE PREFERRED EMBODIMENTS

Now the first preferred embodiment of the present invention will be described with reference to FIGS. 1 to 3. In this hollow rotor blade of a gas turbine, a dimpled core 5 is accommodated within a hollow space formed between two skins 1. Radially inside ends of the skins 1 are held together by means of a dovetail 2 similarly to the blade shown in FIG. 8.

Figure 1:
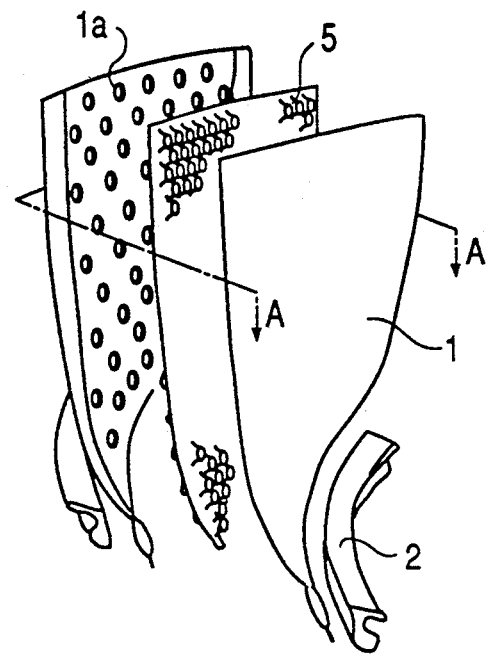
FIG. 1 is an exploded perspective view of a first preferred embodiment of a hollow rotor blade according to the present invention.
Figure 2:
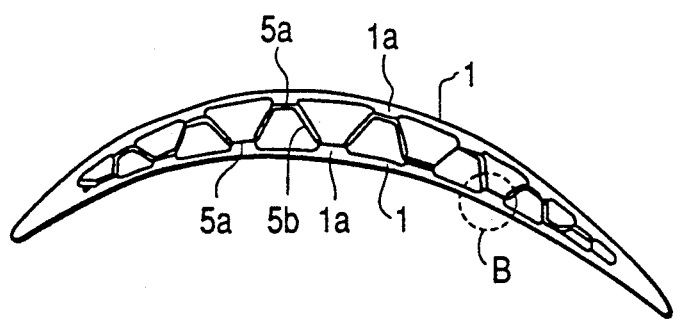
FIG. 2 is a cross-sectional view taken along line A—A in FIG. 1.

The dimpled core 5, as shown in FIGS. 1 and 2, comprises a plurality of dimples having flat top portions 5a and wall portions 5b extending across the space in the direction of thickness of the blade. The dimples are provided over the entire surface of the core by superplastic working directed alternately towards the front side and the rear side of the core. A plurality of island-shaped protrusions 1a are formed on inner surfaces of the skins 1 by chemical milling. These protrusions 1a oppose the top surfaces 5a of the above-mentioned dimples. The hollow rotor blade is formed by joining surfaces of the top portions 5a of the respective dimples to the surfaces of respective ones of the protrusions 1a. The skins 1 can be joined to the dimpled core 5 by diffusion brazing, liquid-phase diffusion bonding, solid-phase diffusion bonding or the like.

Figure 3:
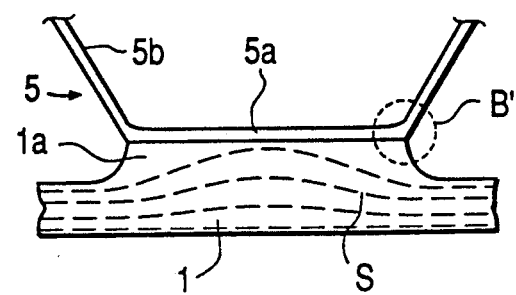
FIG. 3 is an enlarged view of a portion encircled by line B in FIG. 2.
Figure 9:
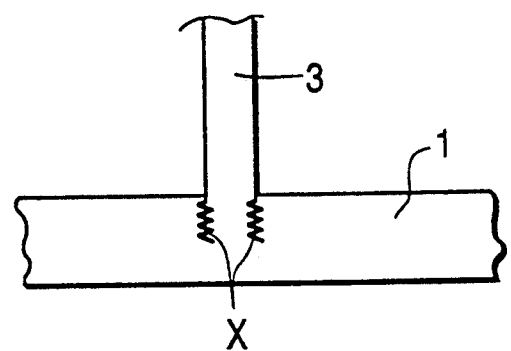
FIG. 9 is an enlarged view of a portion encircled by line D in FIG. 8(b)
Figure 10:
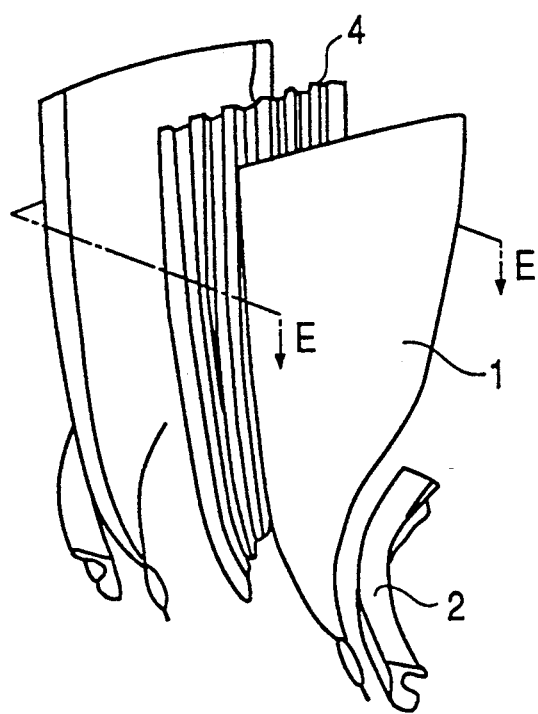
FIG. 10 is an exploded perspective view of a hollow fan blade in the related art, which employs a corrugated plate core.

In this preferred embodiment, owing to the fact that the top portions 5a of the dimpled core 5 are joined to the island-shaped protrusions of the skins 1, lines of stress S indicated by dashed lines in FIG. 3 are generated within the skins 1 by centrifugal forces, aerodynamic loads and the like acting on the moving blade. These stresses are not present where the skins 1 join the dimpled core 5. Accordingly, stress does not concentrate proximate the opposite sides of the protrusions 1a indicated by reference character B' in FIG. 3.

Accordingly, in this preferred embodiment, fatigue strength is enhanced by reducing the stress at the portion of the blade where the skins 1 are joined to the dimpled core 5. As a result, the hollow rotor blade can be made lightweight using thin skins 1.

In order to confirm the advantage of this preferred embodiment, a test piece simulating the joint portion according to this preferred embodiment was prepared, and a fatigue test was conducted.

Figure 11:
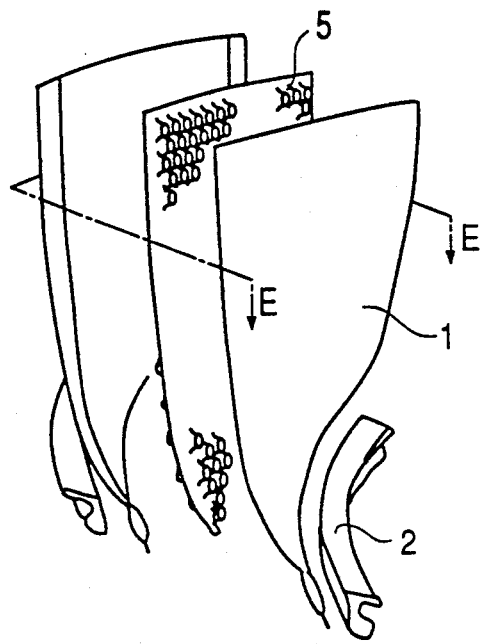
FIG. 11 is an exploded perspective view of a hollow fan moving blade in the related art which employs a dimpled core.
Figure 12:
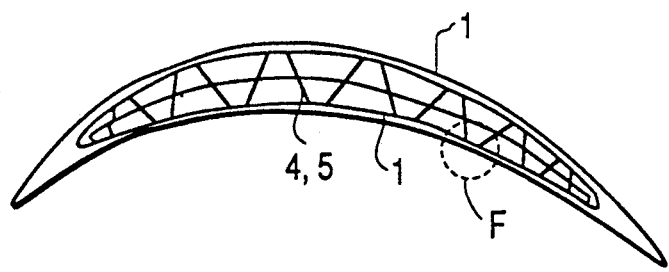
FIG. 12 is a cross-sectional view taken along line E—E in FIG. 10 or FIG. 11.
Figure 13:
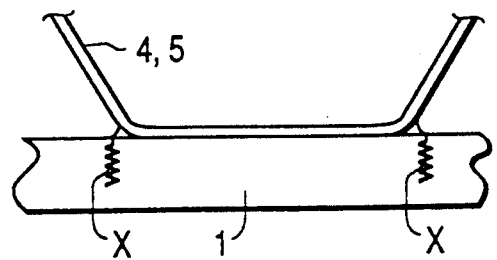
FIG. 13 is an enlarged view of a portion encircled by line F in FIG. 12, which illustrates bonding by brazing.
Figure 14:
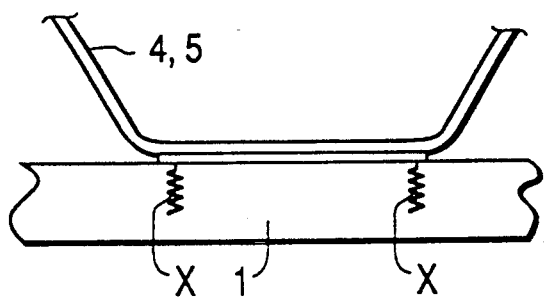
FIG. 14 is an enlarged view of the portion F, which illustrates liquid-phase diffusion bonding.
Figure 15:
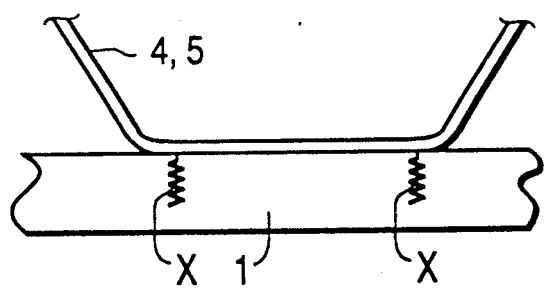
FIG. 15 is an enlarged view of the portion F, which illustrates solid-phase diffusion bonding.

FIG. 4 shows a test piece, prepared as a comparative example by simplifying the dimpled core type hollow rotor blade shown in FIG. 11, in which a cup-shaped body 5 simulating the dimpled core is joined to a simulated skin 1 prepared by chemically milling a flat plate.

On the other hand, FIG. 5 shows a test piece, prepared by simplifying the dimpled core type hollow rotor blade according to the first preferred embodiment, in which an island-shaped protrusion 1a was provided at a central portion of a simulated skin 1 by chemical milling, and a cup-shaped body 5 is joined to this island-shaped protrusion 1a. Specifically, the surfaces of the terrace portions at the opposite ends of the test piece and the island-shaped protrusion 1a were preliminarily coated with sealant so as not to come into contact with milling liquid. Then the test piece was immersed in the chemical milling liquid, whereby the shape of the simulated skin 1 was obtained.

In addition, the simulated skin 1 was joined to the cup-shaped body 5, in each of test pieces of this preferred embodiment and the comparative example, by solid-phase diffusion bonding and diffusion brazing. That is, two kinds of test pieces a and b were prepared. The test pieces were prepared as follows:

(1) Materials: Ti-6Al-4V, AMS4911, Annealed (2) Chemical Milling Liquid: aqueous solution of nitric acid (180–200 g/l) and hydrofluoric acid (45–55 g/l)

(3) Chemical Milling Temperature & Time: Max. 40° C., Max. 1 hour (4) Kind of Sealant: butadiene-styrene group synthetic rubber masking (5) Island-shaped Protrusion: average diameter 7.0 mm, R: 1.0 mm (6) Conditions of Solid-phase Diffusion Bonding: temperature 900°–920° C., pressurized at 0.1 kgf/cm$^2$g, hold time Min. 1 hour (7) Conditions of Diffusion Brazing: temperature 900°–920° C., pressurized at 0.5 kgf/cm$^2$g, hold time Min. 1 hour It is to be noted that as the brazing material Ti-20Cu-20Ni-20Zr is favorable.

The opposite ends of these test pieces were chucked, and a fatigue test was conducted by applying repeated tensile loads. The test results are shown in FIG. 6.

The test pieces according to the first preferred embodiment of the present invention exhibited better results than the test pieces of the comparative examples regardless of whether solid-phase diffusion bonding a or diffusion bonding b was used, although either techniques yield a distribution of data. A remarkable improvement in fatigue strength of about twice as large as that of the related art product was observed, especially when the tensile loads are applied a number of times of $10^5$ or more which is a basic design test standard for strength.

Next, a second preferred embodiment of the present invention will be described with reference to FIG. 7. This embodiment is different from the above-described first preferred embodiment in that dimples having flat top portions 5'a with large surfaces are formed alternately on the rear side and on the front side of a radially inward portion of the dimpled core 5, in that radially inner portions of the skins 1 are provided with large island-shaped portions 1'a in correspondence with the dimples, and in that surfaces of the top portions 5a and 5'a of the dimples of the dimpled core 5 are respectively joined to surfaces of the island-shaped protrusions 1a and 1'a of the skins 1.

This modified embodiment provides effects and advantages similar to those of the above-described first preferred embodiment.

Although a dimpled core is used as a core in the above-described first and second preferred embodiments, the present invention is not limited to such cores, but other shaped cores such as honeycomb cores, corrugated plate cores and the like can be employed. In such cases, the shape of the island-shaped protrusions of the skins depends upon the shape of the core to be joined.

In the hollow rotor blade of a gas turbine according to the present invention, due to the fact that a shaped core accommodated within a hollow space formed between two skins is joined to island-shaped protrusions of the skins, the stress generated in the skins due to centrifugal forces, aerodynamic loads and the like of the moving blade is prevented from propagating to the portions where the skins are joined to the core. Thus, stress will not concentrate at such portions where the skins are joined to the core. Also, the skins and the core can be joined firmly.

Hence, according to the present invention, the fatigue strength of a hollow rotor blade of a gas turbine is enhanced. As a result of this enhancement of the fatigue strength it is possible to use thin skins so that the hollow rotor blade will be lightweight. Thus, cost savings and a reduction in fuel consumption can be realized.

While a principle of the present invention has been described above in connection with preferred embodiments of the invention, it is a matter of course that many apparently widely different embodiments of the present invention can be made without departing from the spirit of the present invention.

What is claimed is:

1. A gas turbine rotor blade comprising: two outer skins disposed at the front and the rear of the blade, respectively, and defining a space therebetween, said skins having respective outer surfaces forming the blade outer surface, and respective inner surfaces bounding opposite sides of the space, said inner surfaces each defining a plurality of protrusions projecting in a direction of thickness of the blade; and a core of shaped sheet metal interposed between said skins within said space, said core including a plurality of wall portions extending across said space in the direction of thickness of the blade from said protrusions projecting at the inner surface of one of said skins to said protrusions projecting at the inner surface of the other of said skins, each of said wall portions being jointed to the protrusions from which and to which the wall portion extends, whereby stresses in the skins will not be concentrated at regions where said wall portions are joined to the protrusions.

2. A gas turbine rotor blade as claimed in claim 1, wherein said protrusions are island-shaped, and said core comprises a plurality of dimples, adjacent ones of said dimples projecting toward one of the skins and the other of the skins, respectively, said dimples being constituted by said flat portions of the core being disposed against and joined to a portions and by flat portions of said core integral with said wall portions at respective ends thereof, each of said flat respective one of said island-shaped protrusions.

3. A gas turbine rotor blade as claimed in claim 2, wherein the flat portions of the dimples at a radially innermost end of the blade each have surfaces of a larger area than those of the flat portions of the dimples at a radially outermost end of the blade.

4. A gas turbine rotor blade as claimed in claim 1, wherein said core has the structure of a honeycomb.

5. A gas turbine rotor blade as claimed in claim 1, wherein said core has a corrugated body constituted by said wall portions and by flat portions of said core integral with said wall portions at respective ends thereof so as to define crests of the corrugations, each of said flat portions of the corrugated body being disposed against and joined to a respective one of said protrusions.

6. A method of making a rotor blade of a gas turbine, said method comprising:
   forming two outer skins each having a surface defining a plurality of protrusions;
   fixing the outer skins together while leaving a space defined therebetween and with said surfaces facing toward one another on opposite sides of said space so as to constitute inner surfaces of the blade;
   providing a core of shaped sheet metal having a plurality of wall portions; and
   interposing said core between the two outer skins with each of said wall portions of the core extending across said space in a direction of thickness of the blade from said protrusions at the inner surface of one of said skins to said protrusions at the inner surface of the other of said skins, and joining each of said wall portions to the protrusions from which and to which the wall portion extends, whereby stresses in the skins will not be concentrated at regions where said wall portions are joined to the protrusions.

7. A method of making a rotor blade of a gas turbine as claimed in claim 6, wherein the joining of the wall portions of the core to the island-shaped protrusions of the skins comprises solid-phase diffusion bounding.

8. A method of making a rotor blade of a gas turbine as claimed in claim 6, wherein the joining of the wall portions of the core to the protrusions of the skins comprises solid-phase diffusion brazing.

9. A method of making a rotor blade of a gas turbine as claimed in claim 6, wherein the fixing of the wall portions of the core to the protrusions of the skins comprises liquid-phase diffusion bounding.

10. A method of making a rotor blade of a gas turbine as claimed in claim 6, wherein the providing of a shaped core comprises working a sheet-like core to form dimples constituted by said wall portions and by flat portions at respective ends of said wall portions and adjacent ones of which dimples project at opposite sides of the core, and the joining of the wall portions to the protrusions is carried out by disposing the flat portions of the dimples against said protrusions and fixing said flat portions to said protrusions.

* * * * *